United States Patent Office 2,728,839
Patented Dec. 27, 1955

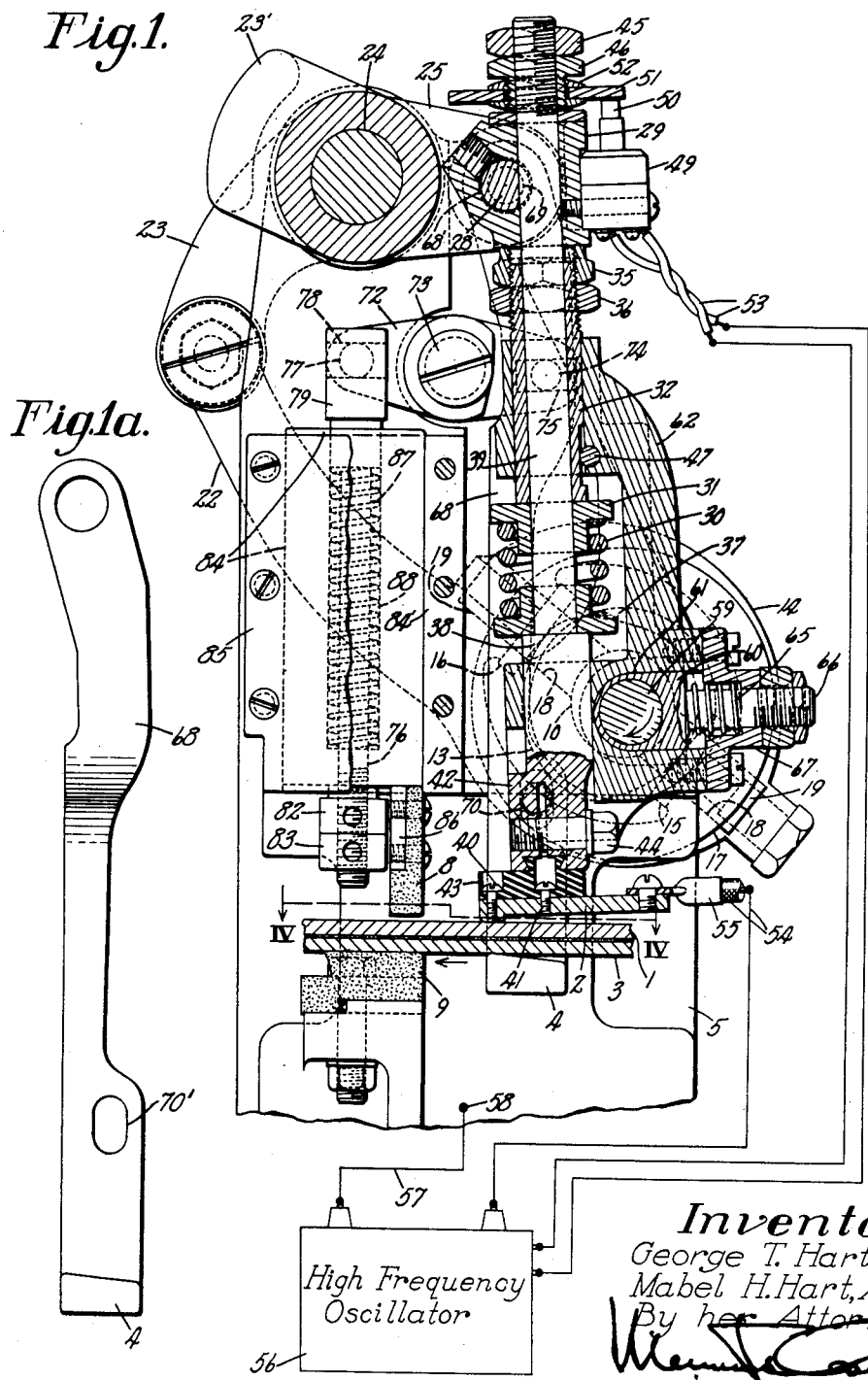

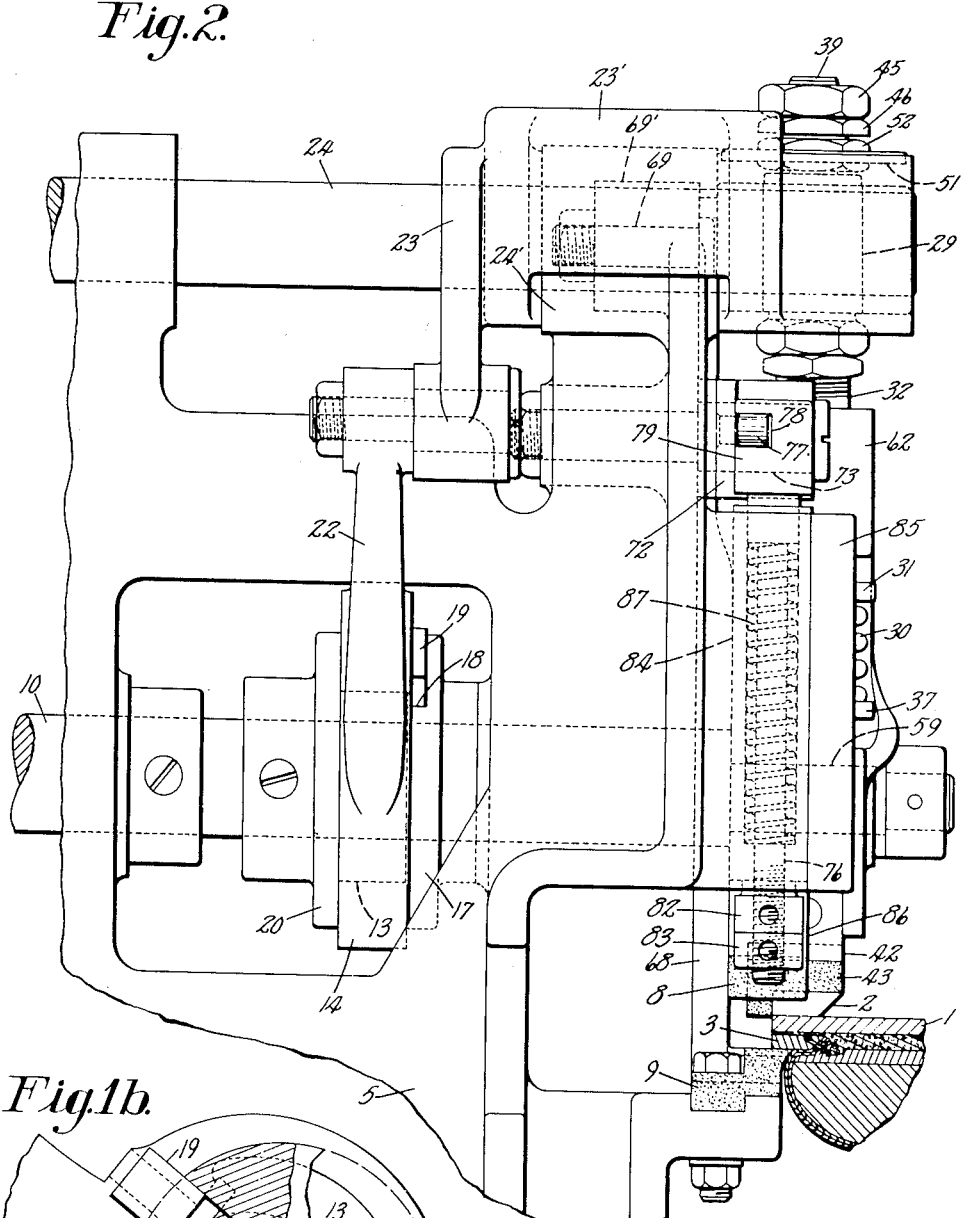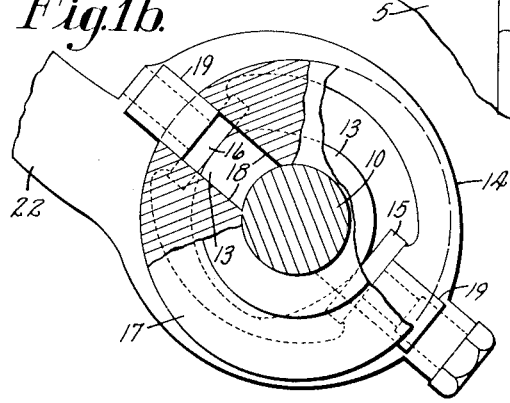

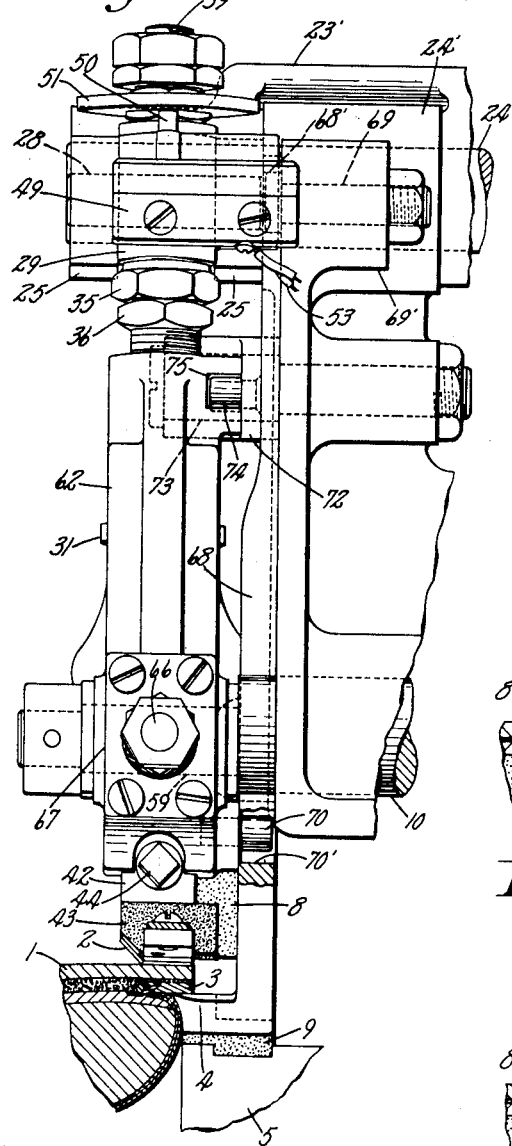

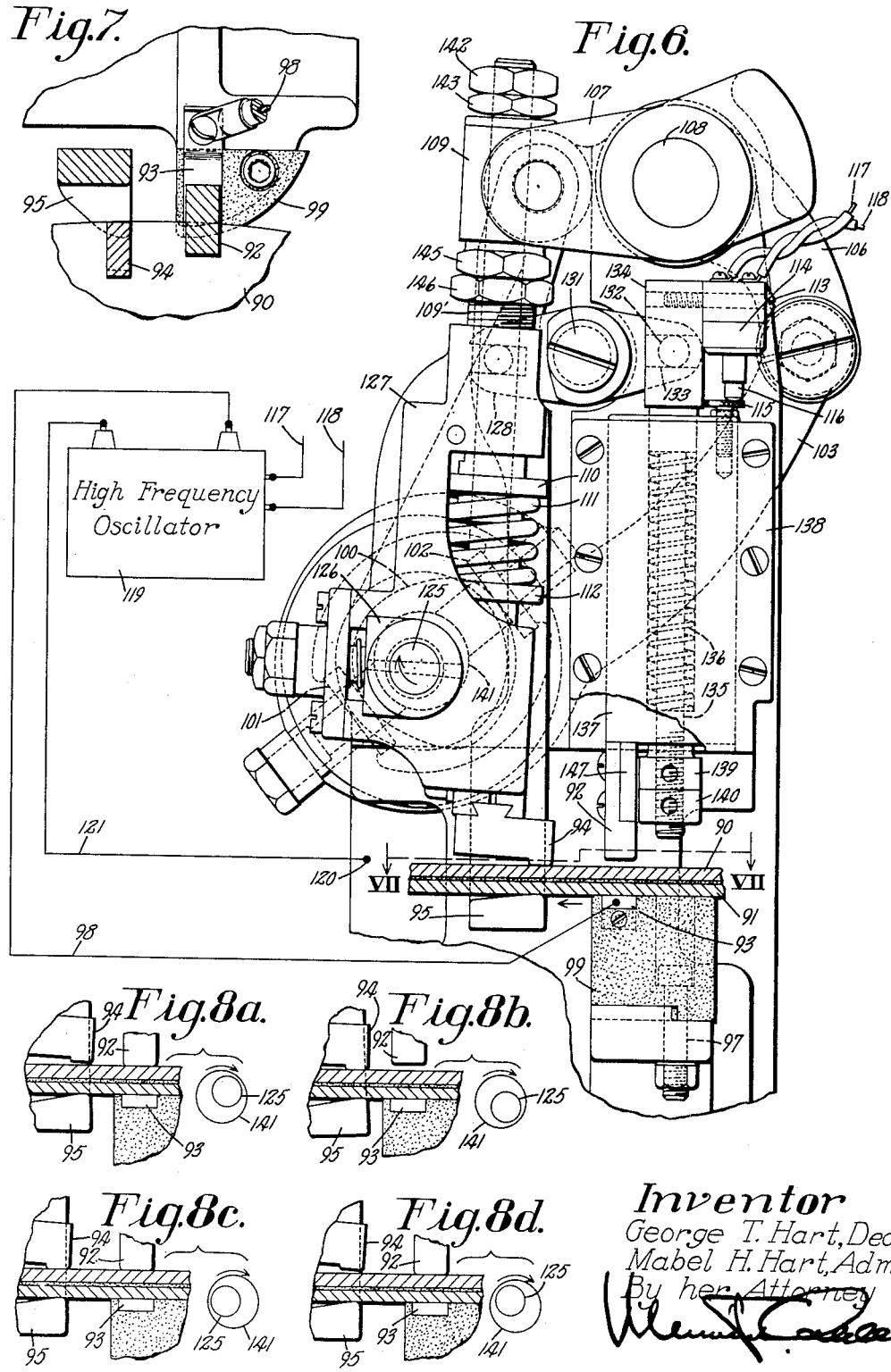

2,728,839

APPARATUS FOR HIGH-FREQUENCY DIELECTRIC PROGRESSIVE BONDING

George T. Hart, deceased, late of Nahant, Mass., by Mabel H. Hart, administratrix, Nahant, Mass., assignor to United Shoe Machinery Corporation, Flemington, N. J., a corporation of New Jersey Original application June 28, 1946, Serial No. 679,994, now Patent No. 2,631,223, dated March 10, 1953. Divided and this application December 9, 1952, Serial No. 324,964

12 Claims. (Cl. 219—10.53)

This application, which is a division of my application Serial No. 679,994, filed June 28, 1946, and entitled "Apparatus for High-Frequency Dielectric Progressive Bonding," now United States Patent No. 2,631,223, issued March 10, 1953, relates to apparatus for progressively bonding plies of thermoplastic materials by subjecting the work to a high-frequency electric field. More particularly, it relates to a switch mechanism, for use with apparatus employing a reciprocatory electrode, to control the timing of the supply of high-frequency energy to the electrode so that the energy is supplied to the electrode only while it is engaging the work.

It has been found that, where the supply of high-frequency electric energy to the electrode of a reciprocatory electrode bonding apparatus is continued during the lifting of the electrode from the surface of the work, arcing may occur between the electrode and the work with consequent burning of and damage to the work.

Accordingly, an important object of this invention is the provision, in a reciprocatory electrode bonding machine, of switch mechanism connected to control the supply of such energy and arranged to be operated in relation to the movements of said electrode so that such energy is supplied to the electrode only during the time that it engages the work.

To this end, and in accordance with a feature of this invention shown in the two illustrative embodiments, a spring-loaded lost motion connection is provided between a vertically movable electrode carrier and a lifting lever (or a lifting member connected to the lever) arranged to be reciprocated by the drive shaft of the machine, and switch contacts are operatively associated with said connection for operation by relative movement between the carrier and the lever or member, to be closed upon a predetermined yielding in said connection consequent to pressure of the electrode against the work.

In accordance with another feature of the invention, means are provided for adjusting the spring-loading of such connection to vary the electrode pressure upon the work and for adjusting the heightwise position of the electrode with respect to said connection for accommodating different thicknesses of work or for varying the switching action with a given thickness of work.

The above and other objects, features and advantages of the invention will be appreciated more fully from the following description and accompanying drawings and will thereafter be pointed out in the appended claims.

In the drawings,

Fig. 1 is a sectional front elevation of a bonding machine embodying the invention and employing electrodes which periodically feed the work while it is being heated and work-holding members which grip the heated work parts together in the intervening periods;

Fig. 1a is a front view of a swinging arm carrying a lower electrode of the above machine;

Fig. 1b is a front view principally of a cam, cam housing and a drive shaft of the same machine;

Fig. 2 is a partial left side elevation of the machine;

Fig. 3 is a partial right side elevation of the machine;

Fig. 4 is a partial sectional plan view taken on the line IV—IV in Fig. 1 and illustrating the work engaging surfaces of the electrodes and work-holding members of the machine;

Figs. 5a to 5d, inclusive, are views in elevation of the work-holding members of the machine illustrating the positional relationships thereof at different points in their cycle of movement, the work being shown in vertical section;

Fig. 5e is a cam chart showing the timing of the driving action of a cam and an eccentric in operating the work-holding member;

Fig. 6 is a front elevation of a modified bonding machine wherein reciprocatory electrode members operate to clamp and hold the work and wherein the work-holding and feeding members engage the work to advance it during the period while the electrodes are apart;

Fig. 7 is a sectional plan view of the work-holding members of the machine of Fig. 6; and Figs. 8a to 8d, inclusive, are views in elevation of such members in positions characteristic of different points in their cycle of movement.

In Figs. 1, 2, 3 and 4, the invention is shown as embodied in a machine wherein electrode members 2 and 4 are adapted for feeding the work, while reciprocatory work-holding members 8, 9, are disposed at a location forward of the electrode members. Such members are shown operatively engaging the welt 3 and outsole 1 of a shoe in the process of manufacture, the welt and outsole having a layer of thermoactive adhesive between them. It will be understood that either or both the welt and outsole may be of synthetic material if desired. The outsole 1 is being engaged by an insulated upper electrode 2 and the welt 3 is being engaged by lower electrode 4 which is grounded electrically to the frame 5 of the machine. Vertical movements of the electrode 2 are controlled by a driven cam 13, to be described later, while lateral movements are imparted by an eccentric 59, both the cam and the eccentric being fixed to a driven shaft 10. In their indicated positions, the upper electrode 2 has just descended upon the work preparatory to imparting thereto a right-to-left motion, and the presser foot 8, comprising one of the work-holding members, has just left the work. A lower member 9, comprising the other work-holding member, is bolted rigidly to the frame of the machine.

Movements of the electrodes 2 and 4, and of the presser foot 8 relative to that of the eccentric 59 are illustrated by several positional views of such members. In Fig. 5a the work is shown held firmly between the presser foot 8 and the supporting member 9 while the electrode members 2 and 4, are separated, at their half-way position in their return left-to-right movement, as indicated by the position of the ecentric 59. In Fig. 5b the presser foot 8 has released the work and the electrode members 2 and 4 have closed upon the work and begun their right-to-left feeding movement, bodily carrying the work along with them as indicated by the arrow and the changed position of the "imperfections" in the upper layer of the work. In Fig. 5c the electrode members are shown as having just arrived at their left-most position and are about to separate from the work, the presser foot 8 having just descended and engaged the work. In Fig. 5d the electrode members have separated and started on their return movement to the right.

As to the matter of imparting vertical movement to the electrode 2, driving power is imparted to the shaft 10 journaled in the frame 5 of the machine, which shaft carries the cam 13 retained in a cam housing 14 (Fig. 1b). Inside the cam housing, a pair of inwardly projecting plates 15 and 16 engage the peripheral surface of the cam 13. The cam housing 14 is retained in position lengthwise of the shaft 10 by means of a circular end plate 20 (Fig. 2) and a corresponding circular plate 17 abutting respectively against the back and front sides of said housing. The circular plate 17 has an inclined groove 18 arranged for slidable engagement with an inclined diametral key or ridge 19 projecting from the front side of the cam housing 14, serving to guide the housing in its oscillatory movement which is derived from rotation of the cam.

The oscillatory movement of the housing 14 is conveyed through a driving link 22 to an upper offset rocker arm 23 pivoted on an overhead shaft 24. Integral with the offset arm 23, and bridging the front bearing 24' for the shaft 24, is a yoke 23' joining the rocker arm 23 to an overhanging bifurcated arm 25 (Figs. 1 and 3) pivoted on the shaft 24 and connected by a pin 28 to an upper collar 29. It will be seen that the arm 23, yoke 23' and arm 25 together constitute a lifting lever which may be reciprocated by rotation of the shaft 10 to impart a rising and falling movement to the collar 29. A sleeve 32 receives the cyclic downward thrusts of the collar 29 upon adjustment nuts 35 and 36 which are threaded onto the upper end of such sleeve, and these thrusts are transmitted, through a loaded spring 30 which is engaged at its upper end by a flanged member 31 abutting against the bottom end of the sleeve 32, to an electrode carrier comprising a vertical rod 39 slidable inside the collar 29 and sleeve 32 axially thereof and carrying at its lower end the upper electrode 2. The lower end of the spring 30 engages a flanged member 37 which is seated on a shoulder 38 of the vertical rod 39. The sleeve 32 in turn, slides inside a yoke member 62, as does the lower section 38 of the rod 39. The sleeve 32 is prevented from turning by the action of a pin 47 inserted through the yoke 62 and bearing against a flattened portion of the sleeve. The shouldered portion 38 has a lower portion 42 which is rectangular in section and which is slotted and dovetailed at the bottom thereof, as shown, to receive and hold the electrode assembly, particularly an insulating member 43 on which is mounted, by means of screws 40 and 41, the electrode 2. A clamp bolt 44 provides the gripping force necessary to hold securely the electrode assembly when inserted into the dovetail.

As the collar 29 descends, as soon as resistance to downward movement of the electrode 2 exceeds the loading of the spring 30, the spring yields, allowing relative vertical movement between the collar 29 and the rod 39. The precompression of the spring 30 accordingly determines the gripping pressure of the electrode members 2 and 4 against the work 1 and 3, and adjustment thereof is made, either by adjusting the heightwise position of the stop nuts 45 and 46, which are carried at the upper end of the electrode carrier rod 39 for cooperating with the upper end of collar 29, thereby also raising or lowering the electrode 2, or by means of similarly adjusting the nuts 35 and 36 on the sleeve 32 in which case the heightwise position of the electrode is not disturbed. Adjustment of the position of the upper electrode member 2 may be made, for example, for accommodating work of different thicknesses. It will be seen that there is thus provided between the collar 29 and the electrode member 2 a spring-biased lost motion connection whose yield pressure may be varied by the foregoing adjustments, either with or without adjusting the electrode position.

To provide for supplying high-frequency electric energy to the electrode members only when they are in firm engagement with the work, a switch 49 is mounted on the side of the upper collar 29. This switch, which may be of the type known as "micro-switch," has a plunger 50 adapted upon very short movement, to open and close the switch contacts for breaking and making an electric circuit therethrough, depending on whether the plunger is either depressed against the pressure of a spring contained in the switch box or allowed to assume an extended position. The plunger 50 is arranged to be actuated by a circular plate 51 mounted on the upper end of the rod 39. The plate 51 is secured on a threaded neck portion forming part of the nut 46 by means of a pair of nuts 52 which screw onto said neck portion on opposite sides of the plate 51. Switching action may accordingly be performed by relative movement between the circular plate 51 and the switch box 49, or in other words between the lifting lever and the electrode which takes place during yielding of the spring 30. On the down stroke of the electrode 2, an oscillator 56 is made operative by the switch when the spring 30 yields under the pressure of the electrode against the work, and on the up stroke, the reverse switching action takes place. The electrodes are thereby supplied with high-frequency electric energy only during the time when they exert more than a predetermined pressure against the work. The vertical position of the circular plate 51 is adjustable on said rod 39 to adjust the timing of the aforesaid switch action, by adjusting the nuts 52 as well as by a repositioning of the nut 46.

The electrical connections shown include a pair of wires 53 running from the switch contacts to the high-frequency oscillator 56. These wires are connected in a circuit (not shown) associated with the oscillator which circuit is adapted to turn the latter on and off. High-frequency power from the oscillator is conducted to the upper electrode 2 through an insulated cable 54 having a connecting lug 55 screwed to a lateral extension of the electrode 2 and through a grounding wire 57 connected between the oscillator ground terminal and a point 58 on the frame of the machine.

Lateral movement is imparted to the electrode member 2 by the action of the eccentric 59 carried at the front end of the main drive shaft 10. The eccentric rotates in a U-shaped block 60 (Fig. 1) which is in slidable engagement with a U-shaped slot 61 in the yoke member 62. As the eccentric rotates, the yoke member 62 is moved laterally back and forth through the action of the block 60 which, in one direction of movement, bears aganist the end of the slot 61 and, in the other, against a spring 65. The spring 65 encircles a bolt 66 projecting outwardly from the block 60 through a cover plate 67 bolted to the side of the yoke 62 and the outer end of the spring is seated against the bottom of a recess in the cover plate 67. From the rotational motion of the eccentric 59, the yoke 62 derives not only the desired rocking and transverse work feeding motion but additionally receives a vertical component of motion which latter motion is superfluous to the electrode movement and is therefore taken up by the sliding action of the yoke 62 on the sleeve 32 and the enlarged section 38 of the rod 39.

The lower electrode 4 is formed by the foot of an L-shaped arm 68 (Fig. 1a) which is swingably suspended by the head 68' (Fig. 3) of a pin 69 carried by a boss 69' in the frame of the machine directly behind the bifurcated arm 25. Lateral movement is given the arm 68, in such manner that the electrode 4 remains directly beneath the opposing upper electrode 2, by means of a pin 70 in yoke 62 projecting rearwardly into a slot 70' (Fig. 3) in the arm 68.

The presser foot 8 is carried by a lug 86 projecting downwardly from the bottom end of a slide member 84 which is slidably retained in a guideway 84' on the front of the frame by a cover 85 held by screws. The slide member 84 and thus the presser foot 8 receive vertical movement through the action of a lever 72 pivoted about a pin 73 inserted into the front of the frame. Carried at one end of the lever 72, a pin 74 (Fig. 3) engages a slot 75 recessed into the upper back portion of the yoke 62 thereby reciprocating the lever in accordance with vertical movements of the yoke. Another pin 77 (Fig.

2) at the other end of the lever 72 engages a slot 78 recessed into the head section 79 of a rod 76 slidable in the slide member 84 whereby the rod is connected to be raised and lowered by reciprocation of the lever. On the upward motion of the rod 76, stop collars 82 and 83 threaded on the lower end of the rod 76 bear against the slide member 84, lifting the latter positively. On the down motion, yielding downward force is provided to the presser foot through compression of a spring 87 which at its upper end bears against a shoulder of the rod 76, while its lower end bears against an annular ledge of the slide member 84. The spring 87 may be adjustably pre-compressed or loaded by means of the threaded stop collars 82 and 83.

It is preferred, although not essential, to construct the presser foot 8 of insulating material since it thereby tends to minimize deflection of the high-frequency field existing between electrodes, especially when the latter are approaching the presser foot in their leftward travel to the position shown in Fig. 5c, forward in the direction of feeding movement. The same is true of support member 9. Suitable for this purpose are Bakelite, hard rubber or other such materials of appropriate strength and wear resistant qualities.

The lower electrode member 4 and the lower supporting member 9 have outwardly extending curved shoulder portions (Figs. 2 and 3) adapted for slidable engagement with the welt crease of the shoe, and, as illustrated in Fig. 4, these members are rounded off at the sides thereof to facilitate free sliding movement of the shoe lengthwise of the crease with respect to these members.

In order for the work to be held securely between the electrode members for movement of the work, the welt engaging surface of the lower electrode 4 is tapered (Fig. 1), being highest at its forward edge, which is directly beneath the upper electrode 2, and sloping off therefrom gently toward the trailing edge. The heavily shaded sections in Fig. 4 represent the work engaging areas viewed in a cross-section of the upper electrode 2 and the presser foot 8. The inside surface of the electrode member 2 is shown substantially flush with the outside edge of the welt and outsole.

Fig. 5e shows the time relationship, in degrees of an operating cycle, between the movements produced by the cam 13 and the eccentric 59 in operating the electrode and the presser foot. The reference, or 0°, position is taken as that shown in Fig. 1.

It has been found convenient to maintain the electrodes at maximum closing pressure, with the spring 30 compressed the maximum amount, during approximately 106° of the cam rotation cycle, allowing 74° thereof for separating the upper electrode 2 from the work, 106° for returning the electrodes to their starting position, and 74° for lowering the electrode 2 against the work and in creating full closing pressure between the electrodes. It is to be noted that during a substantial portion of the latter 74° period allowed for closure of the electrodes, progressive yielding occurs in the spring 30; the reverse is true of the former 74° period during which the electrodes are being separated from the work. To prevent slack movement of the cam housing 14 with its plates 15 and 16, all diameters of the cam 13 through the axis of the shaft 10 are made equal, and are slightly less than the distance between the plates 15 and 16. Means (not shown) may be provided for angular adjustment of the cam with respect to the drive shaft 10 for proper cycling of the cam with respect to the eccentric 59.

It will be observed from Fig. 5e that the switching of the high-frequency energy occurs during change of the pressure of the electrode 2 upon the work so that the energy is supplied to the electrode only while it is engaging the work under pressure. It will also be seen that the duration of the application of the energy is determined by the thickness of the work, since with thicker work the electrode pressure is built up to the switching pressure sooner in the cycle and is not relieved until later in the cycle. It will be seen that changes in the work thickness have the effect in Fig. 5e of raising and lowering the dotted lines indicating the pressure periods, thus varying the cyclic position at which the make and break of the switching occur. Similar effects may be produced for a given work thickness by the adjustments of the plate 51 or of the nuts 35, 36, 45 and 46 as discussed above.

In the alternative embodiment of the invention illustrated in Figs. 6 through 8, many features are employed in common with the foregoing machine of Fig. 1 and many of the remaining features are exactly the reverse of the corresponding features in that machine.

In Fig. 6, an outsole 90 and welt 91, with an interposed layer of thermoactive adhesive, are shown in position between electrode members 92 and 93 and being engaged by work-feeding members 94 and 95. The upper electrode member 92 is grounded to the frame of the machine and undergoes movements similar to those of the presser foot 8 of Fig. 1, whereas the lower insulated electrode member 93 is connected to the high-frequency oscillator 119 through wire 98 and is embedded in, and substantially flush with, the upper surface of a supporting block 99 of insulating material, and, together with the block 99, serves a mechanical function similar to that of the support member 9 in that figure. The block 99 is mounted on the frame of the machine by means of a bolt 97. The work is fed intermittently by the work-feeding members 94 and 95 which are the mechanical counterparts of the corresponding electrode members 2 and 4 in Fig. 1.

Vertical motion is imparted to the foregoing members 94 and 95 by means similar to the mechanism in Fig. 1, including a cam 100, opposing cam plates 101 and 102, a link 103, and an upper offset rocker arm 106, the latter including a bifurcated arm 107 which is pivoted on a shaft 108. Correspondingly, an upper collar 109 carried by the bifurcated arm 107 transmits downward thrusts through a sleeve 109′, a flanged member 110 and a spring 111, to a lower flanged member 112, thereby yieldably pressing the upper feed member 94 against the work. Horizontal movement is imparted to the work-feeding members 94 and 95 through the action of an eccentric 125 in the U-shaped member 126 which operates to swing a yoke 127 laterally back and forth and to slide the yoke up and down the sleeve 109′.

The upper electrode member 92 is bolted to a downwardly projecting lug 147 of an electrode carrier 137 which is mounted for vertical reciprocatory movement in a guideway. The carrier is held in the guideway by a cover 138 secured to the frame of the machine. The electrode carrier 137 receives its up-and-down motion through the action of a lifting lever 128 which is pivoted to reciprocate about a mounting pin 131. One end of the lever 128 is connected to the yoke 127 by a slot-and-pin connection similar to that of Fig. 1 while the other end of the lever 128 carries a pin 132 which engages a slot 133 in a head member 134 of a vertical rod 135 slidable in the carrier 137. A spring 136 and stop collars 139 and 140 associated with the rod 135 function similarly to the corresponding members in the machine of Fig. 1 to provide a spring biased lost motion connection between the lifting lever 128 and the electrode carrier 137. In the manner of the former machine, the cyclic movements of the parts are derived through the rotation of the cam 100 and the eccentric 125. Four representative positions of the work engaging member are shown with reference to the position of the eccentric 125. In Fig. 8a, the work-feeding members 94 and 95, in separated position, have nearly reached their rear or rightmost position preparatory to closing on the work while the electrode members 92 and 93 are shown gripping the work but are about to separate. In Fig. 8b, the electrode members have separated and the work-feeding members have gripped the work preparatory to advancing the work to the left. In Fig. 8c, the electrode members have again descended upon the work and the work-feeding members are about to separate therefrom and return to their starting position; and, in Fig. 8d, the work-feeding members have just separated and have commenced their return motion toward the starting position.

In Fig. 7 the two lowermost members shown in cross section represent the upper electrode member 92 and the upper feed member 94. The insulating block 99 has an outwardly extending shoulder adapted for engagement with the welt crease. The lower supporting member 95 is likewise adapted for engagement with the welt crease. Both members are rounded back from their outer shoulder portions to permit free sliding action of the shoe relative thereto.

In order to supply electric energy to the electrode only during the time that it is pressed against the work, a switch 114, connected to control the operation of an oscillator 119, is mounted on the head member 134 by means of a screw 113, an actuating plunger 116 for the switch projecting downwardly. A screw having a flat head 115 is threaded into the top of the electrode carrier 137 in such a position as to engage the plunger 116 and operate the switch to turn on the oscillator upon the occurrence of relative movement between the head 134 and the electrode carrier 137 upon the yielding of the spring 136 under the pressure of the electrode upon the work surface. As the lifting lever 128 is reciprocated to lift the bar 135, the lost motion provided by the lost-motion connection between the lifting lever and the electrode is taken up and the switch 114 is operated to cause the oscillator to become inoperative before the electrode member 92 is lifted from the work. The wire connections 117 and 118 between the switch 114 and the oscillator 119 complete the control circuit (not shown) of the latter. The oscillator is connected to the upper and lower electrodes respectively by means of conductors 121 and 98, the former being grounded to the frame of the machine at 120.

Adjustments may be made in the machine of Fig. 6 as in the machine of Fig. 1, for example, to adjust the normal vertical position of the electrode 92, the precompression in the spring 136, or the position of the screw head 115 with respect to the switch plunger 116. For example, precompression may be adjusted by varying the position of the collars 139 and 140 on the rod 135. Precompression of the spring 111 may be adjusted by means of nuts 142, 143, 145 and 146.

In the operation of either of the foregoing embodiments, the operator inserts the work between the electrode and work-holding members, turns on the driving power and thereafter guides the work, for example, by maintaining the welt crease on a shoe continuously against guide members such as electrode 4 and the support 9. If desired the electrode switching may be so adjusted that the oscillator is never turned on unless there is a workpiece beneath the electrode.

Having thus described the invention, what is claimed as new and desired to be secured by Letters Patent of the United States is:

1. In a dielectric progressive bonding machine, a frame, a shaft mounted for rotation in said frame, a lifting cam carried by said shaft, an electrode mounted for vertical reciprocation in said frame toward and away from a work surface, an oscillator connected to said electrode, a lifting lever pivoted to said frame, and operatively connected to said lifting cam, said lever having a connection with said electrode providing lost motion after the electrode descends on the work surface, and a switch connected to control the operation of said oscillator and arranged to be operated by relative movement between the said lever and said electrode during such lost motion.

2. In a dielectric progressive bonding machine, a frame, a shaft mounted for rotation in said frame, a lifting cam carried by said shaft, an electrode mounted for vertical movement in said frame toward and away from a work surface, an oscillator connected to said electrode, a lifting lever pivoted to said frame and operatively connected to said lifting cam, a vertically movable lifting member connected to be reciprocated by said lever, said member having a lost motion connection with said electrode providing lost motion after the electrode descends on the work surface, a spring one end of which is associated with the lifting member and the other with the electrode for yieldingly biasing said connection in extended position, a switch connected to control the operation of the oscillator and arranged to be operated by relative movement between the member and said electrode during yielding of the spring, and means for adjusting the vertical position of that end of the spring associated with the lifting member relative thereto for adjusting the yielding pressure of the spring without disturbing the heightwise position of the electrode.

3. In a dielectric progressive bonding machine, a frame, a shaft mounted for rotation in said frame, a lifting cam carried by said shaft, an electrode mounted for vertical movement in said frame toward and from a work surface, an oscillator connected to said electrode, a lifting lever pivoted to said frame and operatively connected to said lifting cam, a vertically movable lifting member connected to be reciprocated by said lever, said member having a lost motion connection with said electrode providing lost motion after the electrode descends on the work surface, a spring one end of which is associated with the lifting member and the other end with the electrode for yieldingly biasing said connection in an extended position, a switch connected to control the operation of the oscillator and arranged to be operated by relative movement between the member and said electrode during yielding of the spring, and a stop member limiting the extension of said lost motion connection to a predetermined amount, said stop member being mounted on and adjustable vertically of one of the parts so connected for simultaneously adjusting the yielding pressure of said lost motion connection and the vertical position of said electrode.

4. In a dielectric progressive bonding machine, a shaft mounted for rotation in said frame, a lifting cam carried by said shaft, an electrode mounted for vertical movement in said frame for movement toward and away from a work surface, an oscillator connected to said electrode, a vertically movable lifting member connected to be reciprocated by said cam, said member having a lost motion connection with said electrode, said connection providing lost motion after the electrode descends on the work surface, a switch connected to control the operation of said oscillator and having contacts arranged in operative association with said lifting member and said electrode to make a circuit therethrough after a predetermined extent of lost motion has occurred, and means for adjusting the said predetermined extent of lost motion.

5. In a machine for seaming dielectric material by the application thereto of a radio-frequency field, means for progressively feeding said material through said field, a reciprocatory electrode for periodically engaging said material, a stop to limit the material-engaging movement of said electrode, an oscillator, switch contacts for turning on and off said oscillator, a pivoted element carrying one of said contacts, means for directly actuating said element to periodically close and open said contacts, and a lost-motion link connecting said electrode with said contact-carrying element whereby said electrode is actuated after the lost motion has been taken up by said link.

6. In a machine for seaming dielectric material by the application thereto of a radio-frequency field, an electrode, an oscillator electrically connected to said electrode to establish said field, a switch mechanism for turning on and off said oscillator, means for operating said switch mechanism periodically, link means providing a lost-motion connection between said switch operating means and said electrode for imparting to said electrode a reciprocatory motion into and out of said dielectric material in timed relation with the turning on and turning off of said oscillator, and stop means for limiting the travel of said electrode into the work, said stop means cooperating with said lost-motion link to provide continued movement of said switch mechanism after the electrode has come to a stop in the material.

7. In an electronic seaming machine having a reciprocatory electrode electrically connected to a radio-frequency oscillator, and a movable presser cooperating with a feed mechanism for advancing material past the electrode, a lift eccentric, a lifting lever operated by said lift eccentric, a switch operated by said lever for turning on and off said oscillator, an electrode-bar carrying said electrode, and a lost-motion connection between said lever and said electrode-bar for moving the lever to take up the lost motion and open the switch before the electrode can begin its lift.

8. An electronic seaming machine comprising a frame, a shaft mounted for rotation in said frame, a cam carried by said shaft, a lifting lever pivoted in said frame and arranged to be rocked by operation of said cam, an electrode-bar carried by said frame for vertical reciprocation, connecting means between said bar and said lever providing a lost-motion connection therebetween, and first and second electrical contacts arranged to be opened and closed by cooperative action of said lever and a member arranged to engage the work during the opening and closing of said contacts and arranged to be positioned by the work heightwise thereof in accordance with its thickness.

9. In a machine for seaming dielectric material by the application thereto of a radio-frequency field, means for progressively feeding said material through said field, a reciprocatory electrode for periodically engaging said material, an oscillator, switch contacts for turning on and off said oscillator, a pivoted element carrying one of said contacts, means for directly actuating said element to periodically close and open said contacts, and a lost-motion link connecting said electrode with said contact-carrying element whereby said electrode is actuated after the lost motion has been taken up by said link.

10. In a machine for sealing together plies of dielectric material by the application thereto of a radio-frequency field, in combination, means for imparting intermittent feeding movements to said material, electrode means for applying pressure to and removing pressure from said plies during said stationary periods, means including said electrode means for applying a radio-frequency field to and removing said radio-frequency field from said plies in the region of the pressure application during each of said stationary periods, and adjustable means for controlling the time of application of the pressure relative to the application of the radio-frequency field.

11. In a machine for sealing together plies of dielectric material by the application thereto of a radio-frequency field, in combination, means for imparting intermittent feeding movements to said material, electrode means for applying pressure to and removing pressure from said plies during said stationary periods, means including said electrode means for applying a radio-frequency field to and removing said radio-frequency field from said plies in the region of the pressure application during each of said stationary periods, adjustable means for controlling the time of application of the pressure relative to the application of the radio-frequency field, and independently adjustable means for controlling the time of removal of the pressure relative to the removal of the radio-frequency field in each of said stationary periods.

12. In a machine for sealing together plies of dielectric material by the application thereto of a radio-frequency field, in combination, means for imparting intermittent feeding movements to said material, means for holding said material stationary for a period between each of said feeding movements, electrode means for applying pressure to and removing pressure from said plies during said stationary periods, means including said electrode means for applying a radio-frequency field to and removing said radio-frequency field from said plies in the region of the pressure application during each of said stationary periods, adjustable means for controlling the time of application of the pressure relative to the application of the radio-frequency field, and independently adjustable means for controlling the time of removal of the pressure relative to the removal of the radio-frequency field in each of said stationary periods.

References Cited in the file of this patent

UNITED STATES PATENTS

| Number | Name | Date |
|---|---|---|
| 1,579,721 | Leslie | Apr. 6, 1926 |
| 1,779,365 | Von Henke | Oct. 21, 1930 |
| 1,847,890 | Osborne | Mar. 1, 1932 |
| 1,986,512 | Meadowcroft | Jan. 1, 1935 |
| 2,401,991 | Walton et al. | June 11, 1946 |
| 2,432,412 | Hacklander | Dec. 9, 1947 |
| 2,477,040 | Brown et al. | July 26, 1949 |
| 2,539,375 | Snyder | Jan. 23, 1951 |
| 2,609,480 | Snyder | Sept. 2, 1952 |
| 2,609,481 | Hacklander | Sept. 2, 1952 |
| 2,623,985 | Hacklander | Dec. 30, 1952 |
| 2,634,363 | Hacklander | Apr. 7, 1953 |